June 18, 1940.  A. L. SCHREIBER  2,205,178
POTTERY LOADING DEVICE
Filed Jan. 23, 1939   9 Sheets-Sheet 9
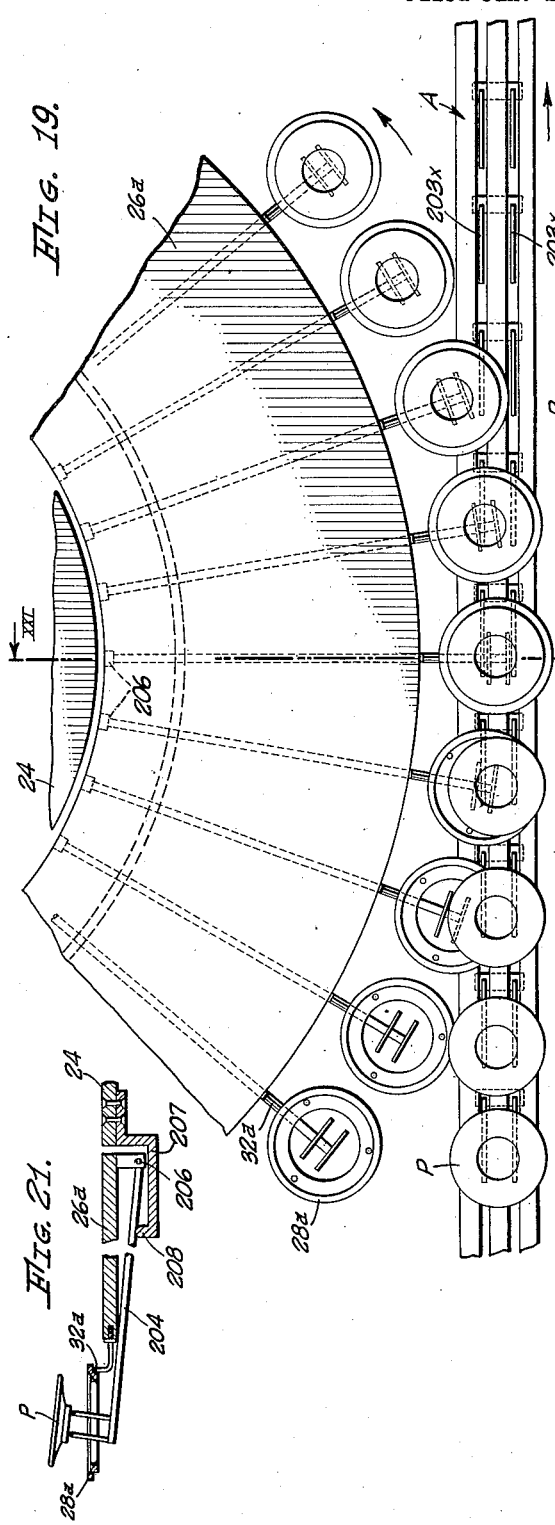
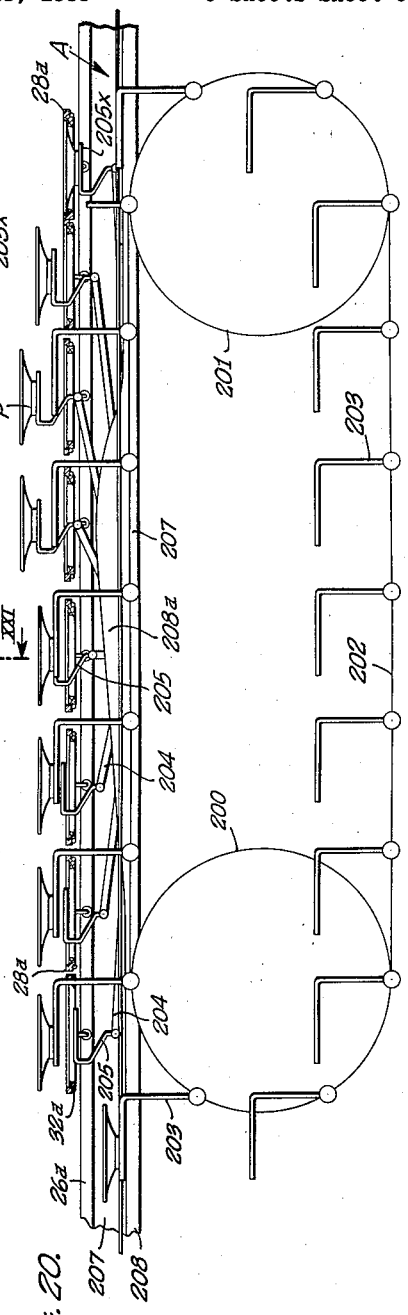
INVENTOR.
ARMIN L. SCHREIBER
BY
ATTORNEY.

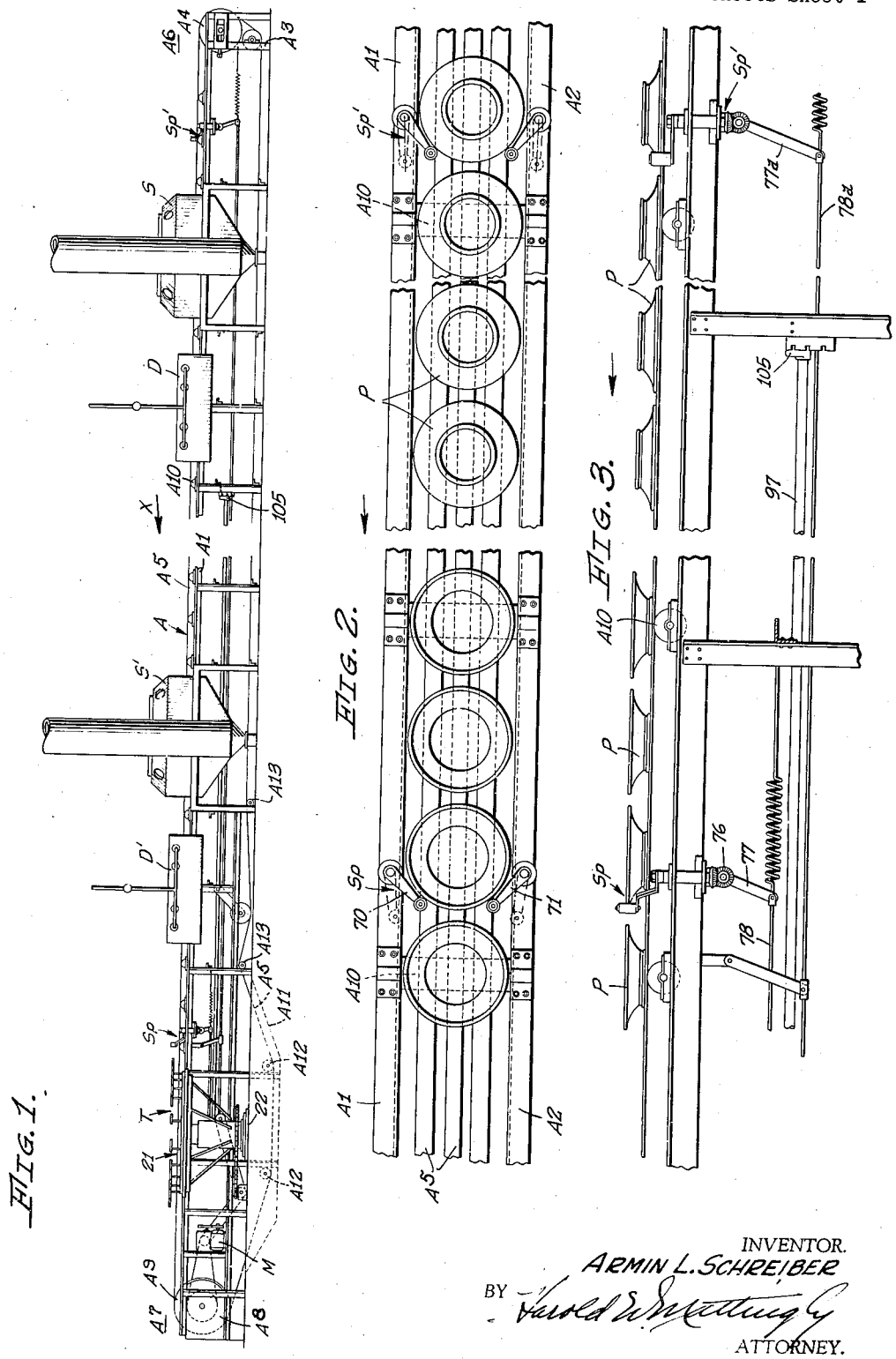

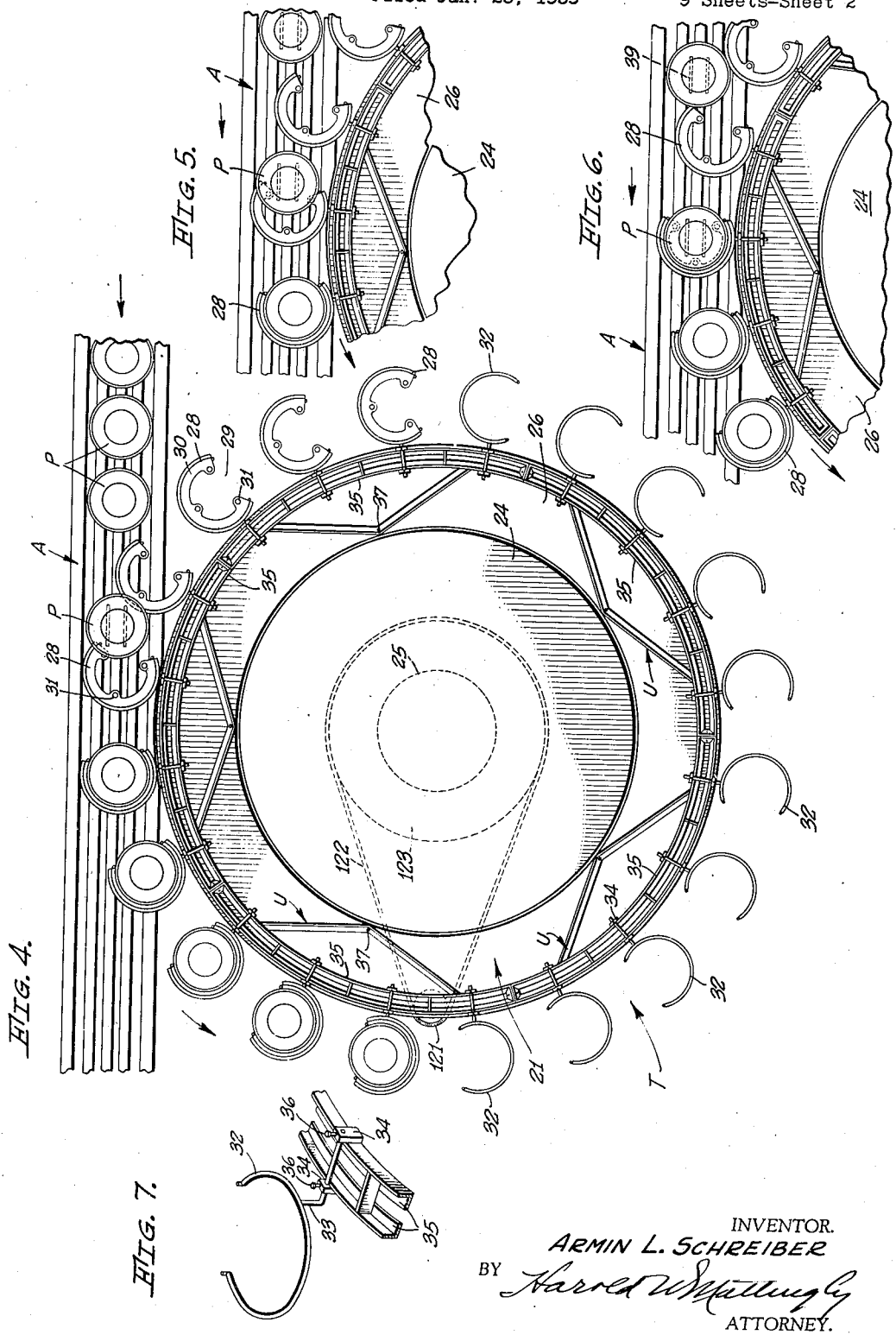

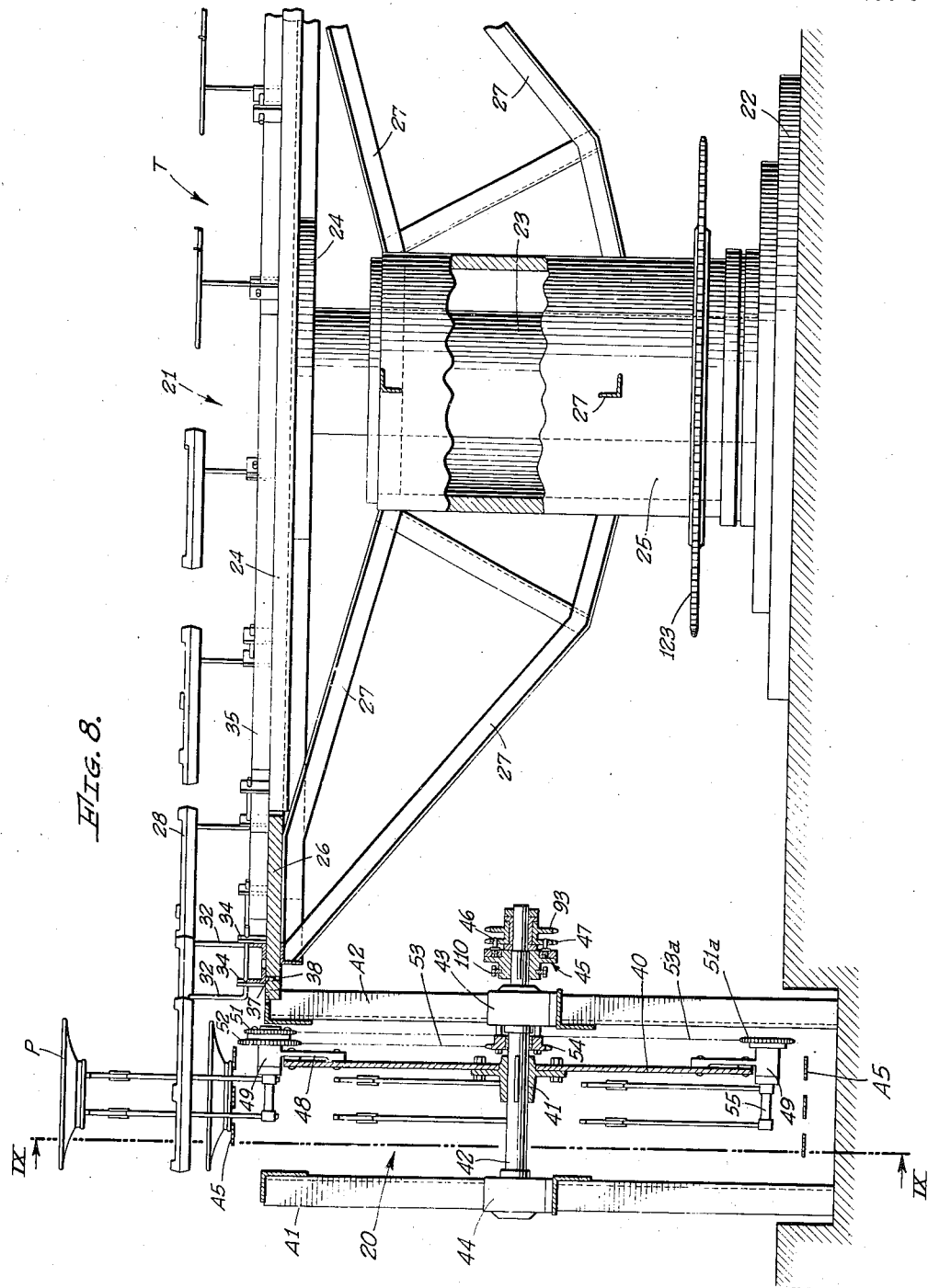

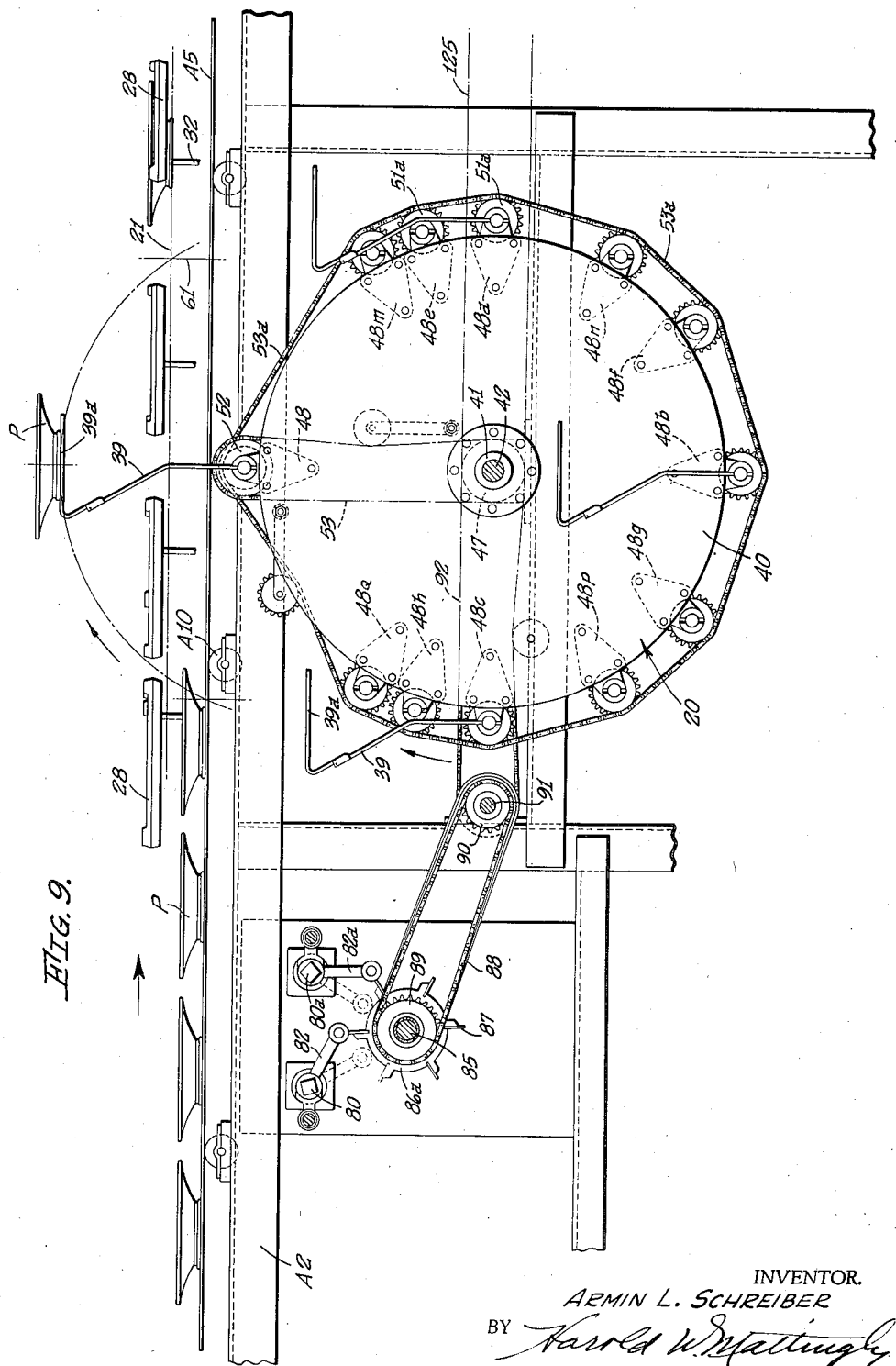

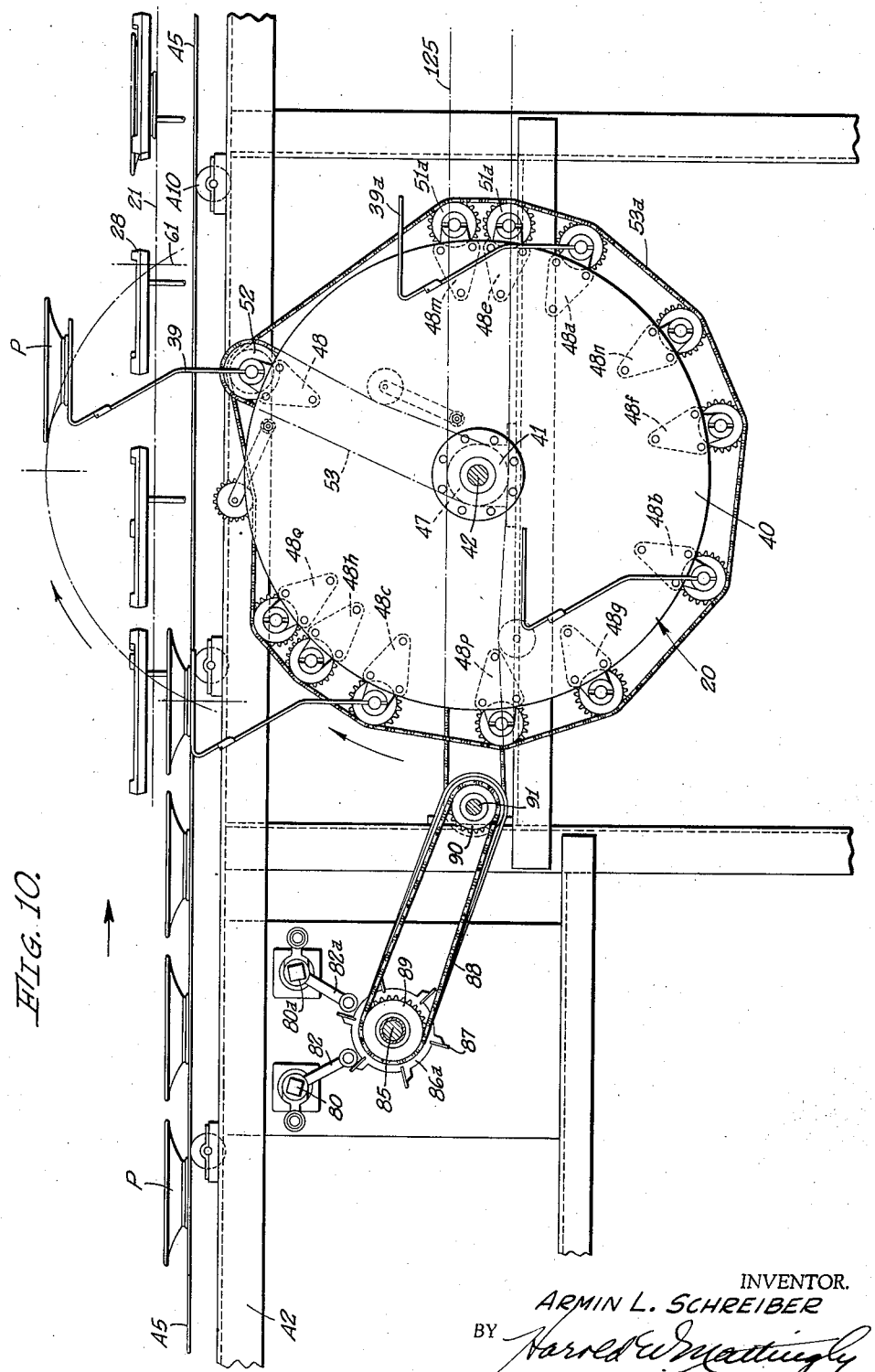

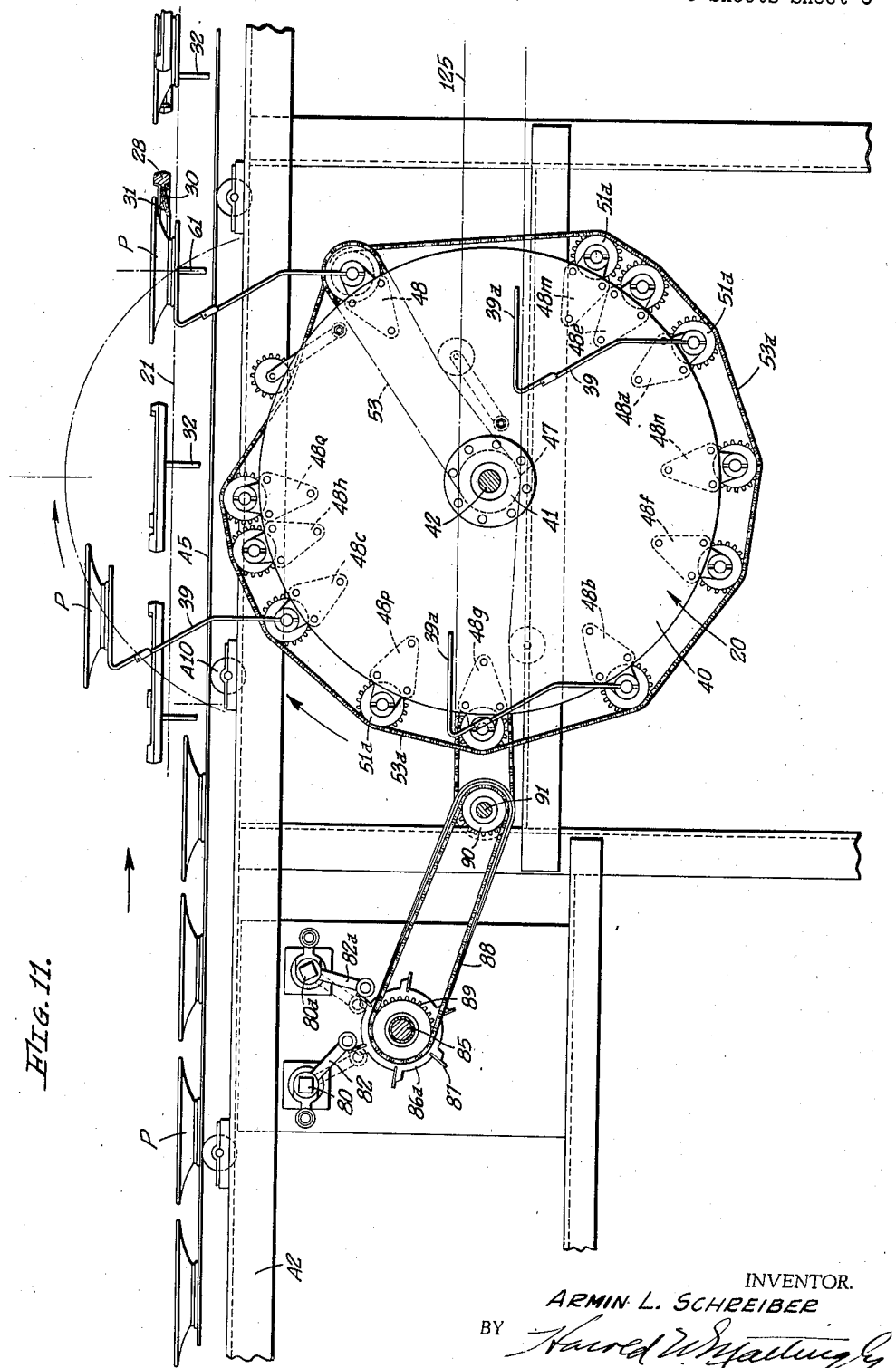

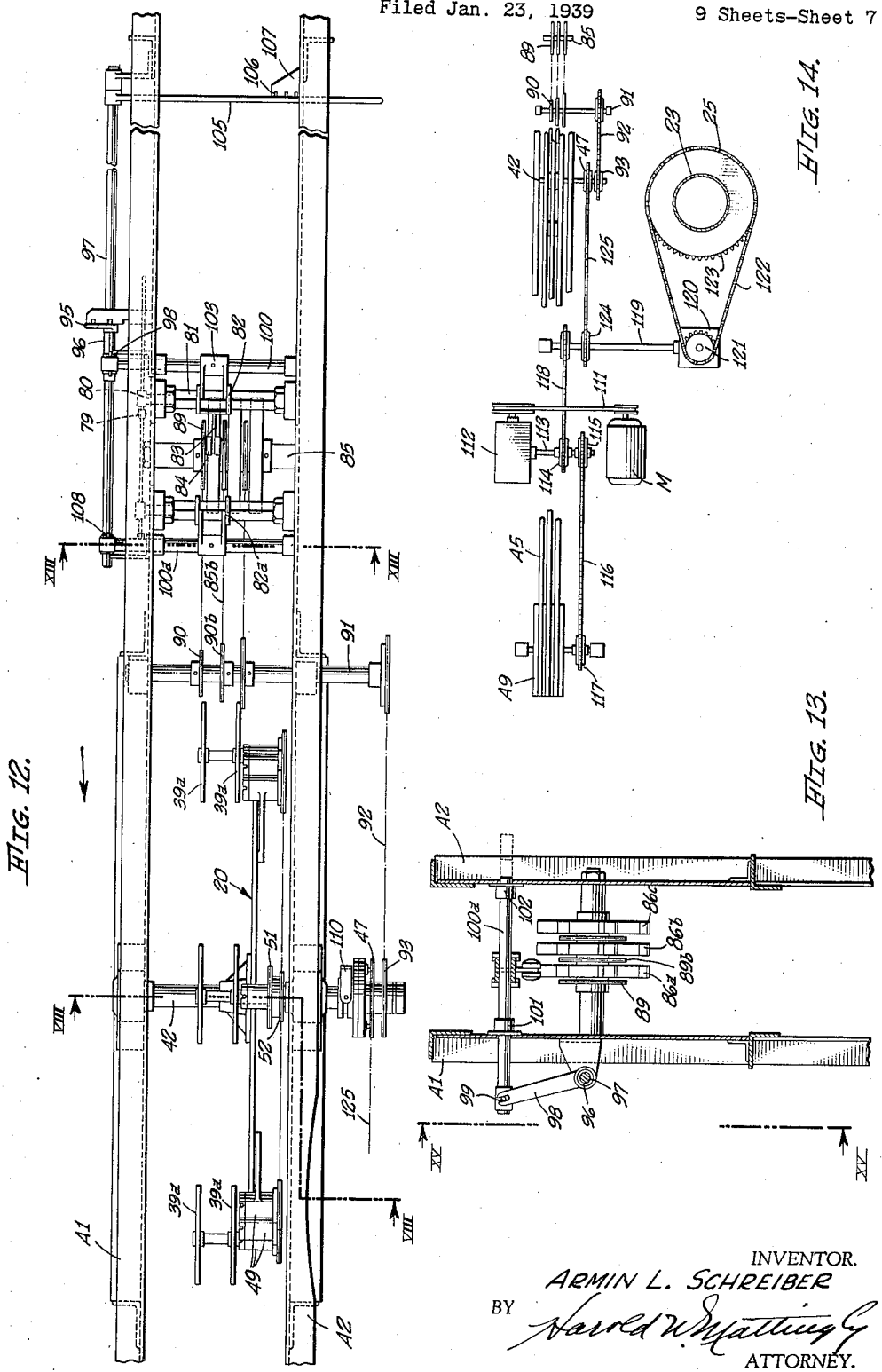

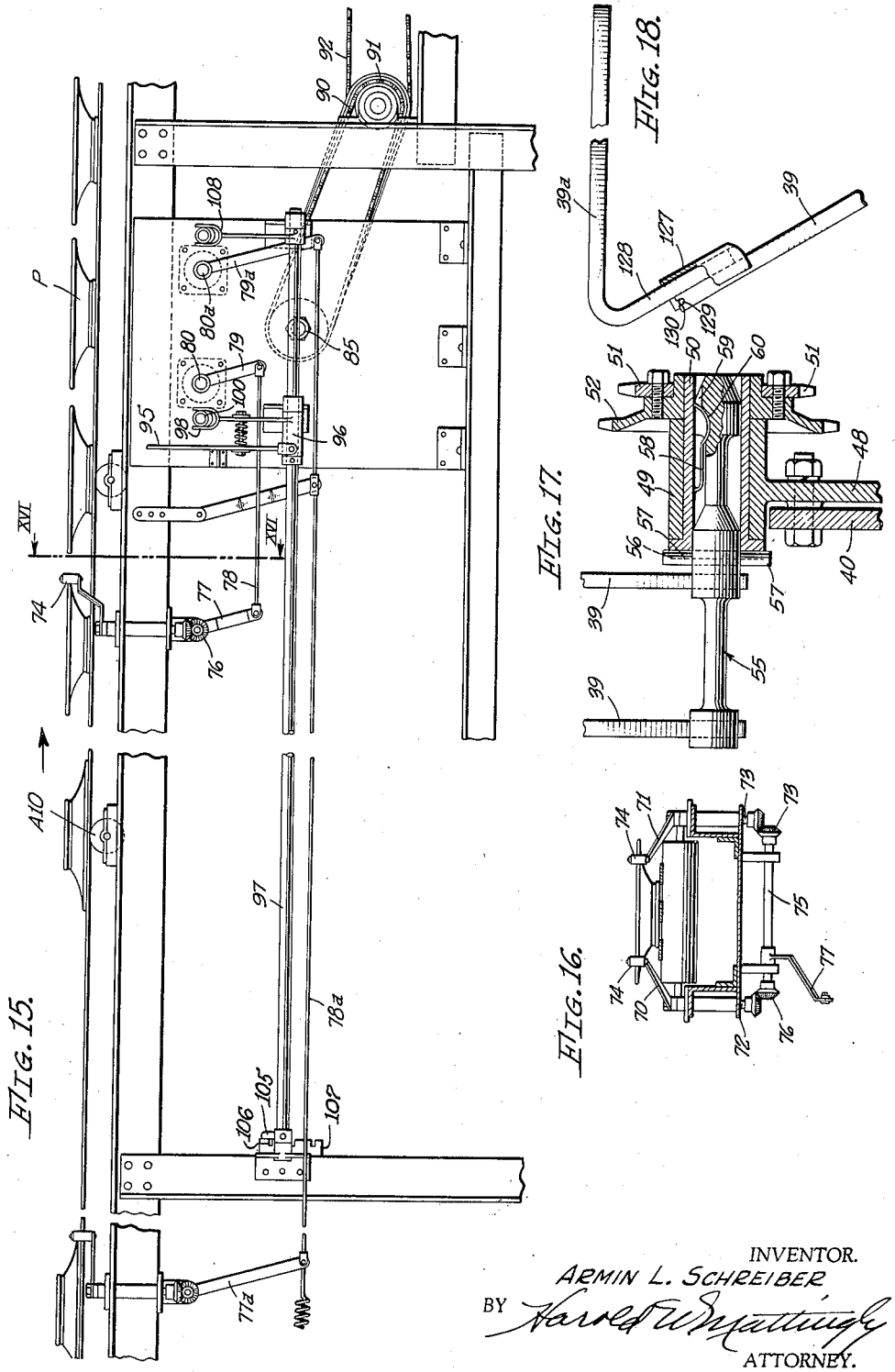

Patented June 18, 1940

2,205,178

UNITED STATES PATENT OFFICE 2,205,178

POTTERY LOADING DEVICE

Armin L. Schreiber, Altadena, Calif., assignor to Vernon Potteries, Ltd., Los Angeles, Calif., a corporation of California Application January 23, 1939, Serial No. 252,409

14 Claims. (Cl. 198—20)

My invention relates to the art of handling of pottery during the manufacture thereof and has particular reference to apparatus for automatically and mechanically transferring pottery articles to setters or other supporting devices employed to support the pottery during firing operations thereon.

In the pottery art it is the common practice to apply glaze material to the pottery pieces while they are in the biscuit form and then to load these pieces into a glaze firing kiln to fire the glaze and finish the pieces. The glazes employed are usually mixtures of finely divided material in a liquid vehicle such as water, the mixture being sprayed upon the surfaces of the pottery piece and allowed to dry. The spraying or application of the glaze material to the surfaces of the pieces is usually accomplished by first spraying one side of the piece of ware, for example, the lower side of the piece, and then the piece is inverted and the top surfaces sprayed with the glaze material. When all of the surfaces have been sprayed, the pieces are then manually picked up and loaded into saggers or setters ready for inserting into the glaze firing kiln.

The manual handling of the pieces, after the glaze material has been applied to all surfaces thereof, frequently injures or destroys the glazing due to the fact that any contact with the pieces while the glaze is still wet either wipes off a part of the glaze material or causes the glaze material to bunch or become thicker at the contacted points, resulting in an uneven finish on the piece after it is fired.

It is therefore an object of my invention to provide a system and apparatus for applying the glaze material to all surfaces of pottery pieces and then mechanically automatically transfer these pieces to setters or saggers or other supporting devices, ready for insertion into the glaze firing kiln without the necessity of manual handling or contacting of any of the pieces.

Another object of my invention is to provide a system and apparatus as set forth in the preceding paragraph which is particularly adapted to the rapid handling of a great number of similar sized and similar shaped pieces of ware.

Another object of my invention is to provide a transfer apparatus which may be employed in combination with a conveyor which conveys pieces from standard and well known glaze spraying machines and in which the transfer apparatus is so coordinated with the movements of the pieces on the conveyor that each piece will be individually picked up and deposited on a setter or similar support to be later used to support the ware in the glaze firing kiln.

Another object of my invention is to provide apparatus of the character set forth in the preceding paragraphs in which the transfer apparatus deposits the pottery pieces upon setters which extend outwardly beyond the periphery of the pieces of material and permits the ready handling of the pieces thereafter without danger of manual contact with the pieces so transferred and so supported.

Another object of my invention is to provide an apparatus as set forth in the preceding paragraphs in which the transfer apparatus may be readily adjusted to automatically handle pieces of different sizes.

Another object of my invention is to provide a device as set forth in the preceding paragraphs in which spacing devices are provided for automatically adjusting the spacing of the pottery pieces along the conveyor from the spraying apparatus as to coordinate the positions of the pieces with the operations of the transfer mechanism.

Another object of my invention is to provide a pottery handling apparatus as set forth in the preceding paragraphs in which the conveyor is provided with automatically actuated spacing mechanism which will space the pottery pieces along the conveyor prior to their entry into the spraying apparatus and thus coordinate the spaced relation of the pieces with the operations of the transfer mechanism.

Other objects and advantages of my invention will be apparent from a study of the following specifications, read in connection with the accompanying drawings, wherein Fig. 1 is a side elevational view of a complete installation and illustrating a preferred manner in which my transfer and spacing mechanisms may be associated with a standard type of conveyor and spraying apparatus;

Fig. 2 is a detail plan view of a portion of the complete installation shown in Fig. 1 and illustrating the manner in which the initial spacing apparatus and the final spacing apparatus may be employed to properly space the pottery pieces along the conveyor;

Fig. 3 is a side elevational view of the apparatus shown in Fig. 2;

Fig. 4 is a plan view of a transfer mechanism constructed in accordance with my invention, associated with a standard type of pottery conveyor and illustrating the relative positions of the parts at one stage of the cycle of operations thereof;

Figs. 5 and 6 are fragmentary views similar to Fig. 4 and illustrating the relative positions of the parts at successive stages in the cycle of operations of my transfer mechanism;

Fig. 7 is a detail perspective view of one of the setter supporting brackets and a portion of the bracket holding units employed in the practice of my invention;

Fig. 8 is a vertical sectional view through the transfer mechanism and rotary table, taken along line VIII—VIII of Fig. 12;

Fig. 9 is a vertical sectional view of the transfer mechanism, taken along line IX—IX of Fig. 8, and illustrating the position of the various parts of the transfer mechanism corresponding to that point in the cycle illustrated in Fig. 4;

Fig. 10 is a vertical sectional view similar to Fig. 9 but illustrating the position of the parts in that portion of the time cycle illustrated in Fig. 5;

Fig. 11 is a vertical sectional view similar to Fig. 9 and illustrating the parts of the transfer mechanism at that point in the cycle illustrated in Fig. 6;

Fig. 12 is a plan view of a portion of the conveyor mechanism with the conveyor tapes removed to illustrate the manner in which the spacing devices may be adjusted to conform with different sized pieces of ware;

Fig. 13 is a vertical sectional view taken along line XIII—XIII of Fig. 12;

Fig. 14 is a diagrammatic view of the power transmission connections for supplying motive power to the various portions of the conveyor, transfer means and rotary table;

Fig. 15 is a side elevational view of a portion of the conveyor mechanism and illustrates the manner in which the spacing mechanism for both the entrance end of the conveyor and that portion of the conveyor immediately adjacent the transfer mechanism are actuated;

Fig. 16 is a fragmentary sectional view along line XVI—XVI of Fig. 15;

Fig. 17 is an enlarged vertical sectional view of a portion of the transfer wheel and illustrates the manner in which the pottery lifters may be removably coupled thereto;

Fig. 18 is a detail fragmentary view of one of the lifters employed in the practice of my invention;

Fig. 19 is a fragmentary plan view of a modified form of rotary table and transfer mechanism adapted for use with full-circle pottery setters or supports;

Fig. 20 is a diagrammatic side elevational view of the rotary table and transfer mechanism shown in Fig. 19; and Fig. 21 is a transverse sectional view taken along line XXI—XXI of Fig. 19.

Referring to the drawings, I have illustrated in Fig. 1 a lay-out of a pottery conveyor, spraying and drying mechanism associated with my transfer apparatus to illustrate the manner in which the movements of pieces of pottery through the glaze spraying devices may be coordinated with the transfer mechanism which will mechanically and automatically remove the pieces of pottery from the conveyor. This installation includes a conveyor indicated generally at A and may comprise a pair of long side standards A—1 and A—2 disposed on opposite sides of the conveyor. Each of the standards comprises an end frame A—3, in which is adjustably mounted an end pulley A—4, over which extends a plurality of endless belts, bands or tapes A—5 to comprise the movable conveying element of the conveyor.

As will be understood by those skilled in this art, the bands or belts A—5 are preferably constructed of relatively thin steel tapes extending throughout the length of the conveyor A and spaced from each other, as indicated in Fig. 2, to provide a relatively wide supporting surface upon which pieces of pottery, such as plates P, may rest and be carried from the entrance end A—6 of the conveyor to the exit A—7 thereof. At the exit end A—7 of the conveyor the side standards A—1 and A—2 are provided with suitable supporting structure A—8 in which is mounted for rotation a relatively large wheel or pulley A—9, over which the endless bands A—5 may pass at that end of the machine, motive power for moving the bands A—5 being usually applied to the wheel or pulley A—9 from a suitable source of power or motor M coupled by means of chain and sprocket drives which will be more fully described hereinafter.

Distributed at suitable intervals along the length of the conveyor A are band supporting rollers A—10 preferably journaled for rotation upon the opposed side standards A—1 and A—2, as indicated particularly in Fig. 2, so as to engage the underneath surface of the bands A—5 and prevent undue sagging of the bands.

The return path for the bands A—5 is preferably somewhat as shown in Fig. 1 wherein near the exit end A—7 of the conveyor the sump or depression A—11 is formed in the floor upon which the conveyor is supported and the bands A—5 are flexed downwardly into such sump over suitable pulleys A—12 to insure the passage of the bands A—5 without interfering with the installation of the transfer mechanism T to be more fully described hereinafter. The remainder of the return path of the bands A—5 may be provided for by the mounting of a plurality of rollers or pulleys A—13 extending transversely between the vertical legs of the adjacent side standards A—1 and A—2, as indicated particularly in Fig. 1.

Spaced a short distance from the entrance end A—6 of the conveyor A is a glaze spray machine S which may be any one of a number of well known types of glaze spraying devices adapted to spray prepared wet glaze upon that surface of the pottery pieces which is disposed upwardly when the pieces are laid upon and are conveyed by the conveyor A. If desired, immediately adjacent the spray S a suitable heating or drying tunnel D may be provided, through which the pottery pieces will be carried by the conveyor and within which blasts of heated air will be directed upon the now coated surfaces of the pottery pieces to dry out at least a great percentage of the moisture in the wet glazed mixture.

Spaced further along the conveyor A in the direction of movement of the pottery pieces thereby (such direction of travel being indicated by the arrow X in Fig. 1) is a second glaze spray machine S', the function of which is to spray or coat the opposite surface of the pottery pieces to that which was coated in the spray machine S. Therefore some considerable space should be provided between the drier D and the second spray machine S' through which the pottery pieces will be conveyed to permit a workman to pick up the pieces (now coated on one side) and invert such pieces so as to present the uncoated surface uppermost, ready to receive the coating in the spray machine S'.

If desired, a second drier D' to assist in the rapid drying of the newly applied glaze coating, may be provided. After both the upper and lower surfaces of the pottery pieces have been sprayed or coated with the glaze material, they are then ready to be conveyed into the glaze firing kiln but, as hereinbefore explained, the coating, though substantially dry, is relatively fragile and any manual contact therewith by the workman tends to remove or otherwise injure that portion of the coating which is so contacted.

In order to permit the removal of the pieces (now coated on all surfaces with the spray material) without requiring the manual handling thereof, I provide the transfer mechanism T which, as will be understood from an inspection of Figs. 4, 5, 6, 8, 9, 10 and 11, provides for automatically and mechanically picking up each of the pottery pieces as it advances along the pottery conveyor and for transferring these pieces from the conveyor to suitable setters, holders or supporting devices which may then be handled in placing the now coated pottery pieces in the glaze firing kiln for the proper firing of the glaze.

This transfer mechanism includes a pick-up or transfer device 20 (see Figs. 8 and 9) and a rotary table 21 (see Figs. 4 and 8).

Referring particularly to Figs. 4 and 8, it will be observed that the rotary table 21 comprises a suitable stationary base 22 adapted to rest upon the floor of the factory or other building housing my mechanism, from which rises a stationary post 23 upon the upper end of which is mounted a service or work table 24.

Surrounding the post 23 is a rotary table supporting structure 25 illustrated particularly in Fig. 8 as comprising a vertically disposed cylinder extending upwardly about the post 23 and mounted upon the post 23 and the base 22 as by suitable bearings, not shown, so as to permit the ready rotation of the rotatable supporting structure 25 about a vertical axis. Secured to the rotatable supporting structure 25 is a ring-like rotary table surface 26 disposed about the periphery of the work table 24 upon suitable brackets 27 extending into connection with the rotating supporting structure 25. For purposes of convenience, the ring-like rotary table 26 may be relatively wide while the work table 24 (as shown particularly in Fig. 4) may be of circular shape of such diameter as to substantially fill the central opening in the rotary table 26 and thus permit the effective utilization of the greatest possible amount of surface area on the work table 24.

A plurality of pottery support or setter carrying brackets are mounted upon the rotary table 26 adapted to be successively brought into a position above and in alignment with the path of movement of the pottery pieces along the conveyer A so as to permit these pottery pieces to be picked up off the conveyor and deposited upon that one of the pottery supports or setters which is then aligned with the direction of movement of the conveyor. The pottery pieces, now supported upon the pottery supports or setters, may then be removed from the rotary table by handling merely the support or setter, the various pieces stacked and conveyed (without actual contact with the pottery pieces) to the glaze firing kiln.

To permit this automatic or mechanical picking up of the pieces and their deposit upon the pottery supports or setters, I provide means for rotating the rotary table 26 so coordinated and synchronized with the movement of the conveyor bands or belts A—5 that one of such pottery supports is presented to the conveyor in time to receive each pottery piece as it is picked from the conveyor.

A more ready understanding of the structure and its operation may be had by considering a series of assumed operations. The spraying apparatus S and S' are preferably continuous spray machines so that in the handling of any series of pieces of pottery through such spray machines it is desirable that the successive spray machines be arranged upon the conveyor in as close relation to each other as possible. Assuming, for example, that the pieces to be treated are small plates, they should be fed or placed upon the entrance end A—6 of the conveyor with relatively small space between the successive plates, somewhat as illustrated in Fig. 2. The pieces are preferably placed face downwardly upon the conveyor belts or bands A—5 so as to expose what will be the under surface of the plates uppermost as these plates are passed into and through the first spray machine S.

After the pieces have passed through the first spray machine and have been inverted either mechanically or manually so as to expose what will be the upper surface of the plates to the second spray machine S', they should be replaced upon the conveyor bands in the same close spaced relation. It follows therefore that the lifting apparatus and the rotary table which will receive the plates must be capable of picking up within a given time the same number of plates as will pass any given point on the conveyor in the same time cycle. However, should larger plates be treated, it follows that a fewer number of such plates will pass any given point on the conveyor in a given time period and hence the lifting mechanism should be then arranged so as to pick up a fewer number of plates within that same time period.

One form of pottery support or setter which may be employed effectively with the transfer and loading device constructed in accordance with my invention is illustrated and described in copending application Serial No. 205,758, filed May 3, 1938, such form of pottery setter being illustrated herein at 28 (see Figs. 4 and 8) as comprising a ring-like piece of fired clay or similar material open at one side, as indicated at 29, and provided with a inwardly extending flange 30 upon which, or upon lips extending inwardly therefrom, may be mounted a plurality of cone-shaped pins 31 adapted to engage the under surface of the pottery pieces with a substantially point contact when the pieces are set down upon the setter.

As illustrated particularly in Fig. 4, these setters 28 may be mounted upon the rotary table 26 as by providing a plurality of brackets 32 distributed in substantially evenly spaced relation about the periphery of the table 26, each of the brackets 32 comprising an open ring-like structure mounted upon an arm 33 which in turn extends through a pair of bearing blocks 34 secured to an arcuate metal frame work 35 disposed about the periphery of the table 26, the brackets 32 being held in a horizontal position by means of suitable set screws 36, one of which may be provided in each of the bearing blocks 34 to engage and clamp the arm 32 securely in place. The arcuate frame work 35 preferably comprises a segment of the circumference of the circle described by the rotary table 26 and preferably is of such length as to accommodate more than one of the brackets 32. Thus when the device is to be used for transferring plates of one particular dimension, there is employed a plurality of units U, each of which includes the segment frame work 35 and such number of brackets 32 as will permit the presentation of one of the brackets (with its setter 28) to the conveyor A in the same timed relation as an equal number of the pottery pieces are presented at a given point along the conveyor. If pottery pieces of a different size are to be handled by the machine, the units U may be interchanged with other similar units but having thereon a different number of brackets for supporting the setters corresponding to the number of the new sized pottery pieces passing a given point along the conveyor during the same time period.

As is illustrated particularly in Fig. 4, five of such units U are arranged in such manner as to completely encircle the periphery of the rotary table 26; all of the units U which are to be associated with the table 26 will represent one-fifth of the total periphery or circumference of the table. Thus the units may be readily interchanged merely by lifting previously used units off of the table 26 and depositing thereon the newly desired units, suitable pins 37 (see Figs. 4 and 8) being provided upon the segment frames 35 to engage aligning holes 38 disposed about the table 26.

As the table 26 is rotated, the brackets 32 will be successively brought into tangential relation with the center line of the conveyor A so that during that portion of the movement of any one of the brackets away from the center line of the conveyor, the pottery setters, with the plates deposited thereon, may be lifted off of the table and stacked either on the work table 24 or on any other suitable support, the now empty brackets continuing their movement about the path described by the rotary table 26 to permit new or unloaded setters to be deposited thereon and also permitting the deposit upon the setters of the supporting pins 31 in the proper relation to receive a plate when that bracket 32 is subsequently moved back to its tangential relation with the conveyor A.

In order to afford ample time for the removal of the pottery pieces from the table 26 and to permit the placing of new setters and the placing of the pins thereon before any one of the brackets will re-arrive at such tangential relation, I prefer to make the table 26 of relatively large diameter and hence I am permitted to drive the same at a relatively slow rotational speed.

In order to affect the automatic mechanical lifting of the plates from the conveyor bands A—5 while the setters on the brackets 32 are passing over the conveyor A, I arrange the lifting mechanism 20 to be driven by the same motive power means which rotates the table 26 and insures synchronous drive therebetween by interconnecting the table 26 and the lifter 29 by means of chains, sprockets and other non-slipping drives.

Referring particularly to Figs. 8 and 9, it will be noted that the lifter comprises a relatively large diameter wheel carrying about its periphery a plurality of lifting rod assemblies 39 so arranged that rotary motion of the wheel will cause these lifting rod assemblies to remain in a vertical position while they move through a circular path of travel which intersects and passes through the plane of movement of the conveyor bands A—5. In the form of the device illustrated herein, the wheel portion of the lifting mechanism comprises a disc or circular plate 40 which may be either formed integrally with or attached to a central hub member 41 fixedly mounted upon a shaft 42 journalled in suitable bearings 43 and 44 upon the two side frames A—1 and A—2 of the conveyor A. The shaft 42 extends through the bearing 43 and has fixed thereto a clutch 45 adapted to engage, as by means of pins 46, with a drive sprocket 47 rotatably mounted upon the extreme outer end of the shaft 42. Thus rotary power imparted to the sprocket 47 will result in a positive rotation of the wheel or disc 40.

Distributed about the periphery of the wheel or disc 40 I mount a plurality of bearing brackets 48 (see Fig. 17), each of which is provided with a cylindrical bearing member 49, within which rotates a sleeve 50 rigidly secured to a drive sprocket 51.

Referring now to Fig. 8, it will be observed that one of the bearing bracket assemblies is provided with an auxiliary drive sprocket 52 rigidly secured to the sleeve 50 associated with this assembly and adapted to be engaged with a chain 53 passing over a stationary sprocket 54 (of the same diameter as sprocket 52) rigidly and non-rotatably mounted upon the bearing 43 for the shaft 52. Thus, though the plate 40 may be rotated, the sprocket 52 will be maintained stationary (that is, will be maintained in a predetermined angular position during the entire rotation of the disc 40). The hollow sleeve 50 provides a socket into which a lifter rod support 55 may be inserted and hence, though the disc 40 may rotate, the lifter rod will remain in a vertical position throughout its travel.

Each of the sleeve assemblies for the other brackets 48 distributed about the disc 40 will likewise be provided with sprockets 51a corresponding to the sprocket 51 hereinbefore described, about all of which sprockets will extend an endless chain 53a which will maintain all of the lifting rod assemblies associated with these brackets in vertical position during the movement of the disc 40.

To insure the accurate positioning of the lifter rod support 55 in the socket or sleeve 50, I provide upon one end of the sleeve 50 a vertically extending notch or slot 56 adapted to receive a vertically extending guide pin 57 secured upon or forming a part of the support 55. Again, in order to hold the lifter rod support 55 within the socket 50 against accidental removal, I may provide a suitable spring latch 58 adapted to extend into a longitudinal slot 59 on the support 55 to frictionally engage a depression 60 therein.

It will be apparent that utilizing this structure will permit the ready insertion of the support 55 into any one of the socket members for any one of the bearing brackets associated with the plate or disc 40 and will permit the ready removal of the same from any of the sockets for insertion into any others of the sockets.

In the form of the device illustrated herein, I have shown two lifter rods 39 carried by the lifter rod support 55, so aligned with the spaces between the central band A—5 on the conveyor A and the outermost bands on the conveyor as to permit the passage of the lifter rods through these spaces as the wheel or disc 40 is rotated. The upper ends of the lifter rods 39 are provided with horizontally extending feet 39a which provide contact surfaces of relatively great length extending in the direction of the movement of the pieces along the conveyor and by employing for each set of lifters two of such rods, the spaced contact surfaces thereof will provide a stable support for lifting and carrying the pottery pieces without danger of dropping the same.

As hereinbefore described, the number of brackets 32 on the rotary table is coordinated with the size of the pottery pieces to be handled and their spacing along the conveyor. Hence it is also necessary that the number of lifting rods or the speed of rotation of the wheel or disc 40 should also be coordinated with the size of the pottery pieces to be handled and the spacing of such pieces along the conveyor; that is, if during a given time interval four pottery pieces will be moved by the conveyor past a given point, the speed of rotation of the disc 40 may be selected such as to make one complete revolution during this same time interval and four sets of lifting rods may be provided spaced 90° apart upon the disc 40. Thus one revolution of the disc 40 will lift four pieces of pottery from the conveyor.

Assuming now that the diameter and speed of rotation of the rotary table 26 and the number of brackets 32 provided thereon is such that during this same time interval four such brackets with pottery setters 28 are presented to the conveyor, the four pieces lifted by the lifting rods may be deposited upon four successively presented setters. In order to avoid shock between the pottery pieces and the feet 39a of the lifting rods as they are brought upwardly into contact with the pottery pieces, and also to avoid shock as the pottery pieces are set down upon the pins of the setters 28, I prefer to select the diameter and speed of rotation of the disc 40 such that the motion of the lifting rods 39 will include a substantial horizontal component at the time the feet of the lifting rods engage the pottery pieces and I approach as nearly as possible the condition that at the instant of contact between the lifting rods and the pieces the horizontal component of this motion will be substantially equal to the horizontal speed of the conveyor bands A—B. Thus the pottery pieces are lifted without sliding them either along the bands or along the feet 39a.

As will be understood by those skilled in this art, the point of contact will occur as the lifting rods are in the upper quadrant of the circle described by their movement and hence the subsequent horizontal travel of the plates or pottery pieces will be at a rate in excess of the forward speed of the conveyor bands.

By referring particularly to Fig. 9, it will be observed that the axis of rotation of the rotary table 26 (indicated by the broken line 61) is offset from the axis of rotation of the transfer wheel or disc 40 so that (see Fig. 6) one plate is picked up by the lifting rods 39 just after the setter 28, on which this plate is to be deposited, has passed over the plate and then, due to the higher rate of forward speed of the plate after it has been picked up, the plate overtakes the advancing setter just as the setter approaches a central position over the conveyor bands. Again by referring to Fig. 11, it will be noted that at the time the plate arrives in this latter position the lifting rods 39 will be in the descending quadrant of their motion and the plate will be deposited upon the setter at the exact point at which the setter reaches the central position over the conveyor.

From the foregoing it will be apparent that I have provided a transfer mechanism which will project upwardly through the space between the forwardly moving conveyor bands, lift the plate without shock and without sliding at a time which will permit the lifting rods supporting the already cleared plate to pass between two of the advancing setters on the rotary table, then the plate will be advanced at such speed as will center the plate over the foremost of these setters at the instant the setter arrives at its point of tangency with the center line of the conveyor, the lifting rods passing through the open side 29 of the setter. The plate will then be deposited upon the setter without shock and without any sliding motion relative either to the setter or to the lifting rods.

In the form of the device shown herein, it is assumed that the size of the plates and their spacing along the conveyor bands is such that four of them will be lifted and deposited upon the setters for each revolution of the disc 40. Assuming now, however, that smaller plates are to be handled by the conveyor and the transfer mechanism, such smaller plates, in order to efficiently use the conveyor and spray mechanisms, should be spaced closer together. The rotary table may therefore be provided with an additional number of setter brackets and the transfer mechanism may be provided with an additional number of lifting rods. I have found that by providing four, five and six sets of lifting rods on the disc 40, substantially all of the usual pottery pieces now manufactured may be effectively handled. This may be accomplished without any reorganization of my apparatus other than substituting different bracket supporting units on the rotary table 26 and employing a different number of sets of lifting rods. This may be accomplished by providing upon the disc 40 a number of bearing brackets 48, as shown in Figs. 9, 10 and 11. One set of such brackets, including the brackets 48, 48a, 48b and 48c, distributed 90° apart about the disc 40, when it is desired to lift four plates per revolution of the disc, may be provided. To adapt the device to handle five plates per revolution, the lifting rod set 39 associated with the bracket 48 will be left in place while that associated with the bracket 48a will be shifted to a new bracket 48e, that associated with bracket 48b should be shifted to another bracket 48f, that associated with the bracket 48c should be shifted to a different bracket 48g, and an additional or fifth set of lifting rods should then be inserted on the bracket 48h, the brackets 48, 48c, 48f, 48g and 48h being distributed at five equal intervals about the circumference of the disc 40. Likewise if six plates are to be handled, the brackets 48, 48b, 48m, 48n, 48p and 48q distributed at six equal intervals about the circumference may be employed to support six lifting rod sets 39.

In order to effectively employ my automatic lifting and transfer mechanism, it is essential that the plates be properly spaced along the conveyor A to coordinate with the movements of the lifting mechanism and the rotary table. I therefore provide an automatic spacing mechanism Sp immediately adjacent the lifting and transfer device T adapted to engage the plates and space them accurately one from the other immediately prior to the engagement of the plates by the lifting rods 39. Such spacing mechanism is illustrated particularly in Figs. 1, 2, 3, 15 and 16 as comprising a pair of crank arms 70 and 71 rigidly secured respectively to shafts 72 and 73 mounted for rotation about a vertical axis on opposite sides of the conveyor A. The outer ends of the crank arms 70 and 71 are provided with rollers 74 preferably constructed of some soft or resilient material for the purpose of engaging the edges of the pottery pieces without injuring the glaze material thereon. Both of the shafts 72 and 73 are interconnected by means of a cross shaft 75 extending between the side standards of the conveyor A, suitable beveled gears 76 being employed to interconnect the shaft 75 with the vertical shafts 72 and 73. It follows that oscillation of the shaft 75 will cause the arms 70—71 to move from a normal outward position (shown in dotted lines in Fig. 2) to an inward position (shown in full lines in Fig. 2), and back to the outward position. The outermost position of the arms 70—71 should be such as to clear the plates or other pieces of pottery travelling along the conveyor A while as the arms are swung inwardly they should intersect the path of movement of the plates, engaging the plates if they are too close together and holding the plates until the proper amount of spacing has been achieved.

To coordinate the movement of the arms 70 with the selected number of brackets on the rotary table 26 and the selected number of lifting rod assemblies, I provide a crank arm 77 on the shaft 75 which is coupled by means of a rod or link 78 to a spacer operating lever 79 (see Fig. 15). The lever 79 is rigidly fixed (see Fig. 12) to a cross shaft 80, a portion of which is squared as indicated at 81 to provide a slide mounting for a rocker 82. The rocker 82 includes a lever or crank arm 83 which bears upon its outer end one or more rollers 84. Disposed below the shaft 80 (see Figs. 9, 12 and 13) is another cross shaft 85, upon which is rotatably mounted a plurality of spacer actuating wheels or cams 86a, 86b and 86c. The cams 86a, 86b and 86c are each provided with a number of cam projections or wings 87 adapted to engage and rock the rocker arm 82 as each of such projections is presented to the rocker arm. One of the cams, for example 86a, is associated with the transfer mechanism when four of the lifting rod assemblies are used thereon and hence during one revolution of the transfer disc or wheel 40 the rocker arm 82 should be actuated four times. To accomplish this result, I drive the cam 86a by means of a suitable sprocket chain 88 individually connected to the cam 86a and also extending about the sprocket 89 rigidly secured upon a drive shaft 91 (see Figs. 9 and 12). The shaft 91 is in turn coupled by means of a chain 92 to a sprocket 93 rigid with the main drive sprocket 47 for the disc 40 (see Fig. 8). The relative sizes of the sprockets 93, 91, 90 and 89 are such that during one revolution of the disc 40 the cam 86 will be so moved as to present four of its cam or wing members 87 to the rocker arm 82 and thus one adjustment of the spacing of the plates will occur for each plate to be engaged by the lifting rods 39 during each revolution of the transfer disc or wheel 40.

The cam 86b may be associated with the wheel 40 when the wheel is to be employed for lifting five of the plates. Revolution of the wheel 40 and the correct timing of the cam 86b may be accomplished by driving this cam individually through a separate sprocket 89b, sprocket chain 88b and a drive sprocket 90b on the shaft 91, the sizes of which sprockets may be so selected as to present five of the cams to the rocker arms 82, upon each revolution of the wheel or disc 40.

Similarly the wheel 86c may be driven in such manner that it will present six of its cams to the rocker arm 82 for each revolution of the wheel 40 when the wheel is arranged to lift six plates per revolution. In order to permit the selection of the appropriate cam wheel 86a, 86b or 86c, depending upon the setting of the wheel 40, I provide a shifting mechanism illustrated particularly in Figs. 12 and 13, such shifting mechanism including a handle 95 rigidly secured to a short sleeve 96 which is in turn rotatably mounted upon a rod or tube 97 extending horizontally along one of the side standards A—1 of the conveyor.

Rigidly secured to the sleeve 96 is a fork 98, the outer end of which is engaged with pins 99 on a shaft 100 slidably mounted in a pair of bearings 101 and 102 on opposite side frames A—1 and A—2 of the conveyor. The sliding shaft 100 has rigidly secured to it an arm 103 which extends into engagement with the rocker arm 82 so that sliding movement of the shaft 100 laterally of the conveyor will cause the rocker arm to slide from a position immediately above the cam 86a to a position above either cam 86b or 86c selectively and thus permit this same rocker arm to be engaged with any of these cams and thus permit any of these cams to control the timing of the operations of the spacer mechanism Sp.

As will be understood by those skilled in this art, it is desirable that the initial feeding or placing of the pottery pieces upon the entrance end of the conveyor should be as close together as possible so that there will be as small a waste space as possible between adjacent pieces and also to insure that when the pottery pieces are brought into effective relation with the spacer Sp they will at least be sufficiently close together that there will always be a plate ready to be lifted by the next succeeding lifting rods. To assist in the initial placing of the pottery pieces upon the conveyor in more or less correct spaced relation, I prefer to permit the pieces to be fed onto the conveyor in substantially abutting relation and then to provide an auxiliary spacing mechanism Sp' near the entrance end of the machine (that is, at some point in advance of the pieces into the first spray machine S) and to operate this spacing device Sp' so as to coordinate the spacing of the successive pieces in correspondence with the spacing necessary when the pieces arrive at the transfer mechanism. For this purpose the spacing mechanism Sp' (see Figs. 1, 2 and 3) may be a duplicate of the spacing mechanism Sp and may be connected to the operating mechanism for the spacing device Sp so as to operate in synchronism therewith. As will be understood from the foregoing description, a number of pottery pieces of a certain size may be sent through the spraying apparatus and to the transfer device and then a different sized set of pieces of pottery may be run through the machine. If, therefore, the spacing mechanism Sp' is so connected to the spacing mechanism Sp as to be always operated in synchronism therewith, it follows that after the last of one sized set of pieces is loaded, the conveyor must be permitted to travel the full distance between the spacing mechanism Sp' and the spacing mechanism Sp before the first of the new sized set of pieces is loaded and considerable waste time and space will occur.

To avoid this waste of time and space, I prefer to separate the operating mechanisms for the two spacers and to provide independent operating devices therefor. By referring particularly to Figs. 3, 9, 12 and 15, it will be noted that the rod 78a connected with the spacing mechanism Sp' extends to and is connected with a lever 79a rigidly secured to a shaft 80a, which latter shaft may be a duplicate of the shaft 80, upon which rides a rocker arm 82a.

Referring particularly to Fig. 9, it will be observed that the rocker arm 82a is so positioned relative to the cams 86a, 86b and 86c as to be engaged selectively by any one of these cams depending upon the lateral positioning of the rocker arm 82a. When the machine is to be used for the conveying and transferring of pieces of pottery of one size, both of the rocker arms 82 and 82a should be engaged by the same cam and hence the spacing mechanisms Sp and Sp' will be operated in synchronism with each other.

Now when it is noted that a change of size is to be made, the workman feeding the plates onto the conveyor will feed the last plate of the previous size onto the conveyor. When the workman between the drier D and the second spray mechanism S' notes that the last of this size of plate has come through the drier D, he may immediately readjust the spacer Sp' to fit the new sized plates which will follow. To permit this to be accomplished, I provide a handle 105 located upon one side of the conveyor A immediately adjacent the drier D. The handle 105 is rigidly secured to the rod 97 which extends from this position along the conveyor to the location of the rocker arm 82a. Thus by moving the handle 105 into any one of a plurality of notches 106 in a notched guide plate 107, the shift lever 108 on the opposite end of the rod 97 will be caused to shift a slide shaft 100a (corresponding to the shaft 100) to move the rocker arm 82a out of engagement with any one of the cams 86a, 86b or 86c with which it had been engaged and into engagement with the newly selected cam corresponding to the new size of plate. Instantly the new sized plates may be fed onto the conveyor and the spacer Sp will thereafter be actuated by the new cam to properly space the new sized plates. Thus a gap along the conveyor only of the length between the entrance end A—6 of the conveyor and the location of the handle 105 need be made between the end of the first set of plates and the beginning of the new set. This gap will ordinarily be sufficient to allow time between the arrival of the transfer mechanism of the last of the first series of plates and the arrival of the first of the new series of plates to permit the change-over of the lifting rod sets 39 to accommodate the new sized plates and to change the bracket units U on the rotary table 26 to accommodate the new sized plates.

To prevent interference between the lifting rods 39 and the brackets 32 during this change-over, I prefer to stop the rotation of the transfer plate or disc 40 while the change is made and for this purpose I have provided the clutch 45—46 (see Figs. 8 and 12) upon the drive shaft 42 for the disc 40 and have provided a suitable operating mechanism such as clutch operating yoke 110 by which this clutch may be either thrown out of or into engagement with the drive sprocket 47.

As hereinbefore stated, it is necessary to accurately coordinate the following drive speeds:
 (1) the speed of travel of the conveyor bands A—5;
 (2) the speed of rotation of the rotary table 26;
 (3) the speed of rotation of the lifter or transfer plate 40; and
 (4) the speed or frequency of operation of the spacers Sp and Sp'.

In Fig. 14 I have illustrated a system of driving connections extending between the drive motor M and all of these various operating mechanisms which will insure this desirable timed relation. The motor M is shown as being coupled through a suitable belt drive 111 to a reduction gear mechanism 112, the driven shaft 113 of which carries two drive sprockets 114 and 115. The drive sprocket 115 is connected by a chain 116 to a drive sprocket 117 which is rigidly secured to the drive pulley A—9 for the conveyor A—5. The sprocket 114 is connected by means of a chain 118 to a jack shaft 119, one end of which is geared or otherwise coupled, as indicated at 120, to drive a sprocket 121, which sprocket is in turn connected by means of a chain 122 to the drive sprocket 123 on the supporting table 25 for the rotary table. A sprocket 124 on the jack shaft 119 is coupled by a chain 125 to the drive sprocket 47 for the transfer disc or plate 40 while, as hereinbefore described, the sprocket 93 on the transfer disc shaft 42 is connected by means of the chain 92 to the cam drive shaft 91. By means of this or some equivalent non-slipping drive, all of these parts are driven in definite timed relation relative to each other.

As will be understood from the foregoing, due to some inaccuracy of adjustment of the brackets 32 on the table 26 or inaccuracy of adjustment or mounting of the lifter rods 39, it may occur that the feet 39a on the rods 39 may inadvertently engage the bracket or some other of the operating parts of the machine. To prevent injury or damage to the machine, if such occurs, I prefer to make the feet 39a of the rods 39 separate from the rods, as indicated in Fig. 18, and to connect them together by a readily detachable connection such as a U-shaped plate 127 welded, soldered or otherwise rigidly secured to the downwardly bent arm 128 of the foot 39a. Opposite ends of the plate 127 should extend laterally of the rod 128 so as to engage opposite sides of the upstanding end of the lifter rod 39 with which it is associated, as clearly indicated in Fig. 18. A pin 129 may extend transversely across and interconnect the ends of the plate 127 to be received in a notch 130 cut into the extreme end of the rod 39. Thus the weight of the foot 39a will hold the pin in engagement with the notch but any interference with the downward movement of the feet 39a will merely hold the feet 39a and allow the rods 39 to be pulled away therefrom. Then adjustment can be made and the feet reassembled merely by placing them upon the associated rod so that the pin 129 reengages the notch 130 thereof.

It will therefore be observed that I have provided a mechanism for mechanically picking up plates or other pieces of pottery which have been coated with glaze material, transferring these pieces of pottery to setters or other supports to permit them to be conveyed to the glaze firing kiln without danger of hand contact with the coated pieces, and in which the machine is readily adaptable to handle different sized pieces of ware with a minimum of alteration and adjustment.

It will also be noted that by employing setters 28 of the character described herein and in my copending application hereinbefore referred to, having at least one open side, the open side of the setters permits the supporting of the plates during the transfer operations by engagement between the lifting rods and the bottoms of the plates, the open side permitting the ready passage of the lifting rods into the interior of the shape described or enclosed by the setter without physical contact therewith. It is therefore apparent that the transfer apparatus constructed as described herein is peculiarly adapted for use with open-sided setters.

However, it is to be noted that my invention is not specifically limited to the use of open-sided pottery setters but may be successfully employed for the transfer of pottery pieces to full-circle setters such as are now in common use in the pottery industry. In Figs. 19, 20 and 21 I have illustrated a modified form of rotary table and transfer mechanism particularly adapted for handling pottery pieces in connection with full-circle setters, indicated at 28a, each of which may be supported upon a ring-like bracket 32a secured to the peripheral edge of the rotary table 26a, which table may be constructed generally in the same manner as described with reference to Figs. 1 through 18. The brackets 32a are arranged to move with the rotary table through a path which is tangential to the path of movement of the pottery pieces or plates P along the conveyor A.

Mounted below the conveyor A I provide a pair of wheels or pulleys 200 and 201, over which passes an endless band, belt or chain 202 carrying a number of pottery lifting units 203 arranged in any suitable manner to be always maintained in a vertical position as they are moved through the oval path described by the chain or belt 202. The lifters 203 will, as the belt or chain passes about the pulley 200, be elevated so as to project through the spaces between the conveyor bands to engage and lift the plates P from the conveyor A.

As was described with reference to Figs. 1 through 18, the speed of movement of the lifters 203 should be so coordinated with the movements of the conveyor bands A that the initial contact between the lifters and the plates be made without jar and without scraping along the plates. As the plates are elevated by the lifters 203 they are raised to a position considerably higher than the level of the setters 28a on the rotary table and, by properly coordinating the speed of rotation of the rotary table with the movement of the belt or chain 202, the plates will be centered over the setters 28a at the point of tangency of the setters with the conveyor A.

To permit the plates to be lowered upon the setters, I provide auxiliary arms 204, one for each of the setters, with auxiliary lifters 205 associated with each of these arms. The arms 204 extend below the rotary table 26 and are pivoted thereto, as indicated at 206. Secured to the stationary portion or work table 24 is a track 207 having an upwardly turned flange 208 thereon (see Fig. 21) adapted to engage the arms 204 at a point spaced considerably outward from the pivot 206 so that as the rotary table moves about its center all of the arms 204 will be supported by the flange 208.

Immediately adjacent the conveyor A the flange 208 is widened, as indicated at 208a, to form an upwardly projecting cam surface over which the arms 204 will ride, causing these arms to be lifted or moved vertically as they pass over the cam section 208. By properly arranging the cam surface 208, it will be apparent from an inspection of Fig. 20 that as each setter approaches tangency with the conveyor A the auxiliary lifter 205 will be gradually raised until its lifter is brought into engagement with the underneath surface of the plate supported upon the transfer lifter 203 and will elevate and will pick the plate off of the transfer lifter at just that instant at which the plate is centered over the setter 28a. As the transfer lifters continue their movement longitudinally and the rotary table 26 continues its rotation, the lifter 203 which had previously been supporting the plate will pass out of alignment with the arcuate path of the setters, the plates at this time being supported upon the auxiliary lifters 205 associated individually with the setters until the lifters 203 arrive at the position indicated at 203x. At such time the lifters 203 will be entirely clear of the setters and may then start their downward and return movement over the pulley 201 without interferring with the plates which have now been transferred to the rotary table.

It will also be noted that by reason of the shape of the cam 208a the auxiliary lifters 205 will gradually descend while holding the plates centered over the respective setters until, as indicated at 205x on Fig. 20, the plates have been permitted to descend into engagement with suitable pins on the ring setters 28a and thereafter the auxiliary lifters 205 may further descend to entirely clear the plate which has been up to this time supported thereby. As the rotary table continues its movements, the setters 28a with the plates now in place thereon may be taken off of the brackets 32a and stacked or transported to the glaze firing kiln while new setters will be placed upon the brackets as they approach the conveyor A, the auxiliary lifters 205x remaining in their lowermost positions until the reapproach of their respective setters toward the conveyor A.

While I have shown and described the preferred embodiment of my invention, I do not desire to be limited to any of the details of construction shown or described herein, except as defined in the appended claims.

I claim:

1. A system for handling ceramic ware during manufacture of the same, including a conveyor means for transporting at a predetermined speed a series of pieces of ware in spaced relation to each other, said conveyor means including a plurality of surfaces extending in the direction of movement of the pieces along the conveyor and laterally spaced from each other, a second conveyor means for transporting said pieces away from said first conveyor means, transfer means interposed between the first and second conveyor means, including a plurality of lifting elements projectable through the spaces between said first conveyor surfaces to engage and lift said pieces from the first conveyor and simultaneously movable in the direction of movement of said first conveyor to deposit them upon the second conveyor, means for so projecting and moving each of said lifting elements at such speed as to produce no relative horizontal motion between said lifting elements and the pieces engaged at the instant of said engagement, and means for moving said second conveyor at such speed as to provide no relative horizontal motion between said pieces and said second conveyor at the instant they are deposited thereon.

2. A system for handling ceramic ware during manufacture of the same, including a continuously moving conveyor means for transporting a series of pieces of ware in spaced relation to each other, a second continuously moving conveyor means for transporting said pieces away from said first conveyor means including a plurality of individual piece supports spaced from each other, and transfer means interposed between the first and second conveyor means, including a plurality of lifting elements movable upwardly to engage and lift said pieces from the first conveyor and simultaneously movable in the direction of movement of said second conveyor to deposit them upon the individual piece supports carried thereby, means coordinating the speed of movement of said lifting means with the speed of said second conveyor for eliminating relative horizontal motion between said pieces and said supports at the instant of deposit.

3. A system for handling ceramic ware during manufacture of the same, including a conveyor means for transporting a series of pieces of ware in spaced relation to each other through one or more stations at which manufacturing operations may be performed upon them and alter said spaced relationship, said conveyor means including a plurality of surfaces extending in the direction of movement of the pieces along the conveyor and laterally spaced from each other, a second conveyor means for transporting said pieces away from said first conveyor means, and transfer means interposed between the first and second conveyor means, including a plurality of lifting elements projectable through the spaces between said first conveyor surfaces to engage and lift said pieces from the first conveyor and to deposit them upon the second conveyor, means coordinating the speed of movement of said lifting means with the speed of said pieces along said first conveyor, spacing means adjacent the entrance end of said first conveyor means for engaging pieces and for spacing them therealong in approximate coordinated relation with the lifting movements of said transfer means, and additional spacing means adjacent said transfer means for engaging and spacing the pieces along said first conveyor means in coordinated relation with the lifting movements of said transfer means.

4. A system for handling ceramic ware during manufacture of the same, including a conveyor means for transporting a series of pieces of ware in spaced relation to each other, said conveyor means including a plurality of surfaces extending in the direction of movement of the pieces along the conveyor and laterally spaced from each other, a second conveyor means for transporting said pieces away from said first conveyor means, and transfer means interposed between the first and second conveyor means, including a plurality of lifting elements projectable through the spaces between said first conveyor surfaces to engage and lift said pieces from the first conveyor and to deposit them upon the second conveyor, means coordinating the speed of movement of said lifting means with the speed of said pieces along said first conveyor, spacing means adjacent said transfer means for engaging pieces on said first conveyor and for spacing them therealong in predetermined coordinated relation with the lifting movements of said transfer means, additional spacing means adjacent the entrance end of said first conveyor means for engaging and spacing the pieces therealong in predetermined coordinated relation with the lifting movements of said transfer means, actuating means associated with each of said spacing means for actuating the same independent of the other, and means associated with each of said actuating means for independently altering said predetermined coordinated relation between the spacing and the lifting movements.

5. A system for handling ceramic ware during manufacture of the same, including an elongated conveyor extending past one or more stations at which manufacturing operations may be performed upon said pieces, said conveyor means comprising a plurality of longitudinally extending bands spaced laterally from each other to provide a laterally interrupted surface for supporting and conveying said pieces, transfer means for engaging and lifting said pieces of ware from said conveyor including a rotatable element mounted for rotation about a horizontal axis transverse to the movement of pieces along said conveyor, a plurality of lifting elements mounted upon and spaced about said rotatable elements and projectable by rotation of said element through the spaces of said conveyor whereby rotation of said element will successively project said lifting elements through said spaces, spacing means associated with said conveyor for engaging and spacing said pieces along said conveyor in predetermined relation, and means for coordinating the speed of movement of said rotatable element and the actuation of said spacing means to coordinate the projection of the successive lifting elements with the arrival of successive pieces of ware into position to be engaged by said lifting elements.

6. In a system for handling seramic ware during manufacture of the same, including an elongated conveyor extending past one or more stations at which manufacturing operations may be performed upon said pieces, said conveyor means comprising a plurality of longitudinally extending bands spaced laterally from each other to provide a laterally interrupted surface for supporting and conveying said pieces, transfer means for engaging and lifting pieces of ware from said conveyor including a plurality of lifting elements, a rotatable element carrying said lifting elements through a circular path of travel disposed in a plane parallel to the direction of movement of said pieces along said conveyor and intersecting said path of travel, and means for driving said rotatable element at such speed relative to the speed of advance of said pieces along said conveyor that the horizontal elements at the instant of projection thereof through the spaces of said conveyor is substantially equal to the speed of the advancing movement of the pieces along said conveyor.

7. A system for handling ceramic ware during manufacture of the same, including an elongated conveyor extending past one or more stations at which manufacturing operations may be performed upon said pieces, said conveyor means comprising a plurality of longitudinally extending bands spaced laterally from each other to provide a laterally interrupted surface for supporting and conveying said pieces, a second conveying means for transporting said pieces away from the first conveyor means, including a rotating table, a plurality of brackets distributed at equally spaced intervals about said rotary table for holding pottery supports adapted to receive and support said pieces of ware, means mounting said rotary table for rotation in a horizontal plane such as to cause the pottery supports to describe a circular path of travel tangential to the path of movement of said pieces along said first conveyor, and transfer means associated with the said first and second conveyors including at least one lifting element projectable through the space on said first conveyor, means mounting said lifting element for movement through a path tangential with the path described by said supports, and means for moving said lifting lement through said path at rates of speed equal to both the speed of movement of said pieces along said first conveyor and the speed of movement of said pottery supports.

8. A system for handling ceramic ware during manufacture of the same, including an elongated conveyor extending past one or more stations at which manufacturing operations may be performed upon said pieces, said conveyor means comprising a plurality of longitudinally extending bands spaced laterally from each other to provide a laterally interrupted surface for supporting and conveying said pieces, a second conveying means for transporting said pieces away from the first conveyor means, including a rotating table, a plurality of brackets distributed at equally spaced intervals about said rotary table for holding pottery supports adapted to receive and support said pieces of ware, means mounting said rotary table for rotation in a horizontal plane such as to cause the pottery supports to describe a circular path of travel tangential to the path of movement of said pieces along said first conveyor, transfer means associated with the said first and second conveyors including at least one lifting element projectable through the space on said first conveyor, means mounting said lifting element for movement through a path tangential with the path described by said supports, means for moving said lifting element through said path at rates of speed equal to both the speed of movement of said pieces along said first conveyor and the speed of movement of said pottery supports, and means for adjusting the number of said supports presented to said first conveyor, the spacing of said pieces on said first conveyor and the rate of projection of said lifting elements through said first conveyor to adjust the system for the handling of pieces of ware of different size.

9. A system for handling ceramic ware during manufacture of the same, including an elongated conveyor extending past one or more stations at which manufacturing operations may be performed upon said pieces, said conveyor means comprising a plurality of longitudinally extending bands spaced laterally from each other to provide a laterally interrupted surface for supporting and conveying said pieces, transfer means for engaging and lifting pieces of ware from said conveyor including a wheel element mounted for rotation about a horizontal axis transverse to the direction of movement of the pieces along said conveyor, a plurality of lifter supporting means on said wheel element arranged in a plurality of groups thereon, each of said groups including a different number of said supports and the supports of each group being disposed at equally spaced intervals about said wheel element, and a plurality of lifting elements interchangeably mounted upon said supports and operable upon rotation of said wheel to move through a circular path of travel intersecting the path of travel of pieces along said conveyor whereby rotation of said wheel element will successively project one of said lifting elements at equal intervals of time through the spaces of said conveyor.

10. A system for handling ceramic ware during manufacture of the same, including an elongated conveyor extending past one or more stations at which manufacturing operations may be performed upon said pieces, said conveyor means comprising a plurality of longitudinally extending bands spaced laterally from each other to provide a laterally interrupted surface for supporting and conveying said pieces, transfer means for engaging and lifting pieces of ware from said conveyor including a wheel element mounted for rotation about a horizontal axis transverse to the direction of movement of the pieces along said conveyor, a plurality of lifter supporting means on said wheel element arranged in a plurality of groups thereon, each of said groups including a different number of said supports and the supports of each group being disposed at equally spaced intervals about said wheel element, a plurality of lifting elements interchangeably mounted upon said supports and operable upon rotation of said wheel to move through a circular path of travel intersecting the path of travel of pieces along said conveyor whereby rotation of said wheel element will successively project one of said lifting elements at equal intervals of time through the spaces of said conveyor, and means for maintaining said lifting elements in a vertical position throughout their circular path of travel.

11. A system for handling ceramic ware during manufacture of the same, including an elongated conveyor extending past one or more stations at which manufacturing operations may be performed upon said pieces, said conveyor means comprising a plurality of longitudinally extending bands spaced laterally from each other to provide a laterally interrupted surface for supporting and conveying said pieces, a second conveying means for transporting said pieces away from the first conveyor means, including a rotating table, a plurality of units disposed at equal intervals about said rotary table, each unit including a plurality of brackets equally spaced thereon in an arcuate path concentric with the axis of rotation of the rotary table, the end brackets in adjacent units being disposed at the same intervals as that for adjacent brackets on the same unit, means mounting said rotary table for rotation about a vertical axis such as to move the brackets through a circular path tangential with the path of movement of pieces on said first conveyor, and transfer means associated with said first conveyor for lifting said pieces therefrom and for depositing the same on the brackets of said rotary table.

12. A system for handling ceramic ware during manufacture of the same, including a conveyor means for transporting a series of pieces of ware in spaced relation to each other through one or more stations at which manufacturing operations may be performed upon them, a second conveying means for transporting said pieces away from the first conveyor means, a plurality of pottery setters disposed upon said second conveyor means to be presented one by one to said first conveyor means, each of said setters comprising an interrupted annulus shape upon which the pottery piece may rest, and transfer means interposed between said first and second conveyor means and including a plurality of lifting elements for engagement with the lower surfaces of said pieces and movable through the open side of the setters to center the pieces upon said setters.

13. A system for handling ceramic ware during manufacture of the same, including a conveyor means for supporting a plurality of pieces of ware, a plurality of pottery supporting setters disposed upon said conveyor means, each of said pottery setters comprising an interrupted annulus, and means for placing pieces of ware upon said setters, including lifting elements for engaging said pieces and movable through the open side of said setters to align said pieces centrally above said setters.

14. A system for handling ceramic ware during manufacturing of the same, including a conveyor means for transporting a series of pieces of ware in spaced relation to each other through one or more stations at which manufacturing operations may be performed upon them, a second conveyor means for transporting said pieces away from said first conveyor and located at a higher level than said first conveyor, transfer mechanism interposed between the first and second conveyor means including a plurality of lifting elements to engage and lift said pieces from the first conveyor and to elevate them to a level higher than the level of said second conveyor means, means associated with said second conveyor means and pojectable above the level of said second conveyor means to engage and lift pieces from said lifting elements, and means for causing said second named lifting means to lower said pieces upon said second conveyor means.

ARMIN L. SCHREIBER.